United States Patent [19]

Hetman

[11] Patent Number: 5,964,188
[45] Date of Patent: Oct. 12, 1999

[54] SMALL ANIMAL LITTER MATERIAL MANUFACTURING METHOD

[76] Inventor: David Hetman, 53 Brighton Ave., Belleville, N.J. 07109

[21] Appl. No.: 08/970,004

[22] Filed: Nov. 13, 1997

[51] Int. Cl.⁶ .................................................. A01K 1/015
[52] U.S. Cl. ............................................................ 119/172
[58] Field of Search ................................... 119/172, 171, 119/28.5

[56] References Cited

U.S. PATENT DOCUMENTS

| | | | |
|---|---|---|---|
| 4,376,422 | 3/1983 | Whitehead et al. ......................... | 119/1 |
| 5,209,186 | 5/1993 | Dewing ...................................... | 119/172 |
| 5,770,138 | 6/1998 | Yoder ........................................ | 264/117 |

*Primary Examiner*—Jack W. Lavinder
*Assistant Examiner*—Yvonne R. Abbott

[57] ABSTRACT

A method of producing cat litter is disclosed including the steps of shredding sheets of paper to generate strips, filling a water permeable bag with the strips, saturating the bag and strips therein with water while simultaneously decomposing the strips by way of agitation, and drying the bag with the strips therein for a predetermined amount of time until the strips are dry.

9 Claims, 3 Drawing Sheets

5,964,188

SMALL ANIMAL LITTER MATERIAL MANUFACTURING METHOD

BACKGROUND OF THE INVENTION

1. Field of the Invention

The present invention relates to cat litter and more particularly pertains to a new small animal litter material manufacturing method for producing cat litter absent of additives and the weight of conventional cat litter.

2. Description of the Prior Art

The use of cat litter is known in the prior art. More specifically, cat litter heretofore devised and utilized are known to consist basically of familiar, expected and obvious structural configurations, notwithstanding the myriad of designs encompassed by the crowded prior art which have been developed for the fulfillment of countless objectives and requirements.

Known prior art cat litter include U.S. Pat. No. 4,619,862; U.S. Pat. No. 4,723,509; U.S. Pat. No. 5,347,950; U.S. Pat. No. 4,721,059; U.S. Pat. No. 4,378,756; and U.S. Pat. Des. 310,588.

In these respects, the small animal litter material manufacturing method according to the present invention substantially departs from the conventional concepts and designs of the prior art, and in so doing provides an apparatus primarily developed for the purpose of producing cat litter absent of additives and the weight of conventional cat litter.

SUMMARY OF THE INVENTION

In view of the foregoing disadvantages inherent in the known types of cat litter now present in the prior art, the present invention provides a new small animal litter material manufacturing method construction wherein the same can be utilized for producing cat litter absent of additives and the weight of conventional cat litter.

The general purpose of the present invention, which will be described subsequently in greater detail, is to provide a new small animal litter material manufacturing method apparatus and method which has many of the advantages of the cat litter mentioned heretofore and many novel features that result in a new small animal litter material manufacturing method which is not anticipated, rendered obvious, suggested, or even implied by any of the prior art cat litter, either alone or in any combination thereof.

To attain this, the present invention generally comprises a plurality of sheets of full-size paper based newspaper. Next, a shredder is provided which is adapted to shred the sheets of newspaper into strips. Each of such strips preferably has a length of about ¼ of an inch and a width of about 1 inch. During use, the sheets of newspaper are shredded within the shredder to generate the strips. Next provided is a cloth bag permeable to water. As shown in FIG. 4, the cloth bag has an opening with a string coupled adjacent thereto. By this structure, the cloth bag may be selectively tied shut to define a closed interior. While performing the method, the cloth bag is filled with the strips. Thereafter, the opening is closed by way of the string. A washing machine is provided which is adapted to fill with water and further agitate the water for a predetermined amount of time. The cloth bag, with the strips situated therein, is saturated with water within the washing machine. The agitation of the washing machine further effects the decomposition of the strips. Finally, a drier is included having a tumbler mounted therein. The tumbler (not shown) is adapted to rotate and further generate heat therein. The cloth bag with the strips therein are situated within the dryer for a predetermined amount of time until the strips are dry.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new small animal litter material manufacturing method apparatus and method which has many of the advantages of the cat litter mentioned heretofore and many novel features that result in a new small animal litter material manufacturing method which is not anticipated, rendered obvious, suggested, or even implied by any of the prior art cat litter, either alone or in any combination thereof.

It is another object of the present invention to provide a new small animal litter material manufacturing method which may be easily and efficiently manufactured and marketed.

It is a further object of the present invention to provide a new small animal litter material manufacturing method which is of a durable and reliable construction.

An even further object of the present invention is to provide a new small animal litter material manufacturing method which is susceptible of a low cost of manufacture with regard to both materials and labor, and which accordingly is then susceptible of low prices of sale to the consuming public, thereby making such small animal litter material manufacturing method economically available to the buying public.

Still yet another object of the present invention is to provide a new small animal litter material manufacturing method which provides in the apparatuses and methods of the prior art some of the advantages thereof, while simultaneously overcoming some of the disadvantages normally associated therewith.

Still another object of the present invention is to provide a new small animal litter material manufacturing method for manufacturing cat litter absent of additives and the weight of conventional cat litter.

Even still another object of the present invention is to provide a new small animal litter material manufacturing method that includes the steps of shredding sheets of paper to generate strips, filling a water permeable bag with the strips, saturating the bag and strips therein with water while simultaneously decomposing the strips by way of agitation, and drying the bag with the strips therein for a predetermined amount of time until the strips are dry.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
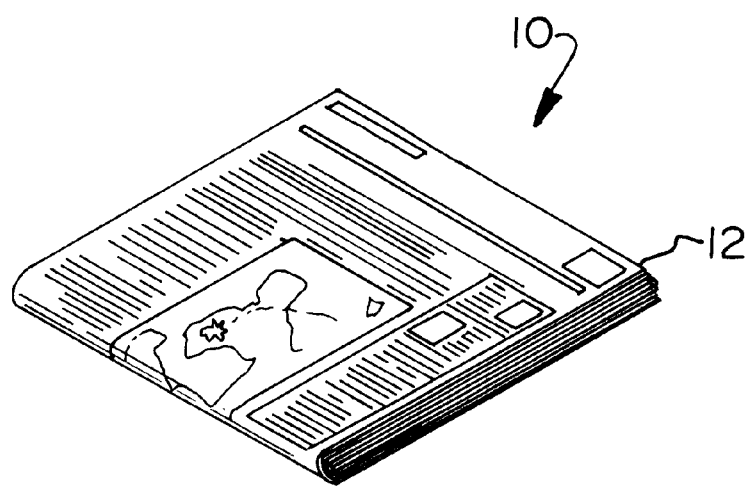
FIG. 1 is a perspective view of the present invention.
Figure 2:
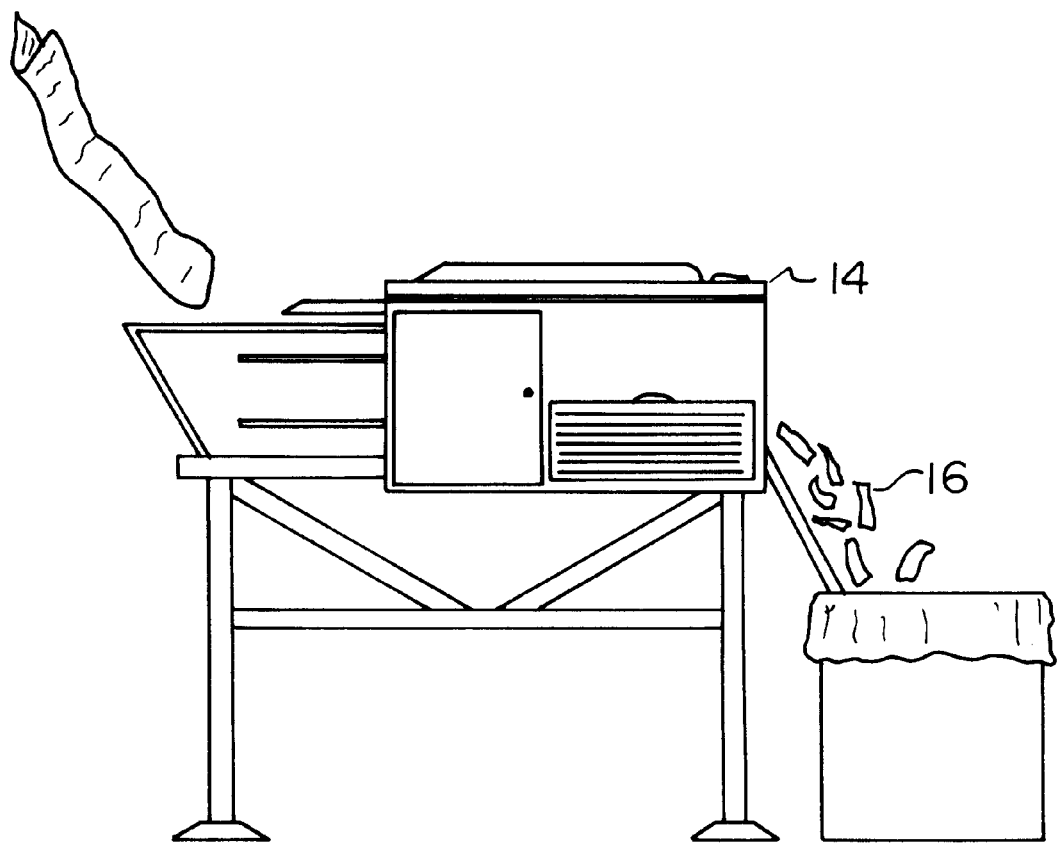
FIG. 2 is a side view of the shredder of the present invention.
Figure 3:
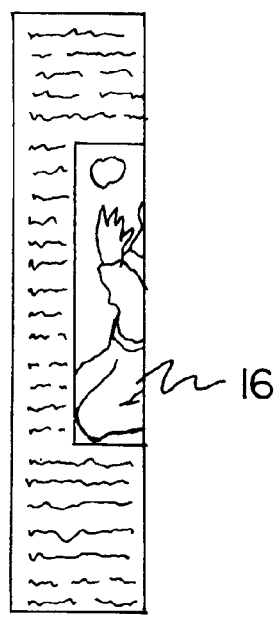
FIG. 3 is a front view of one of the strips of the present invention.

With reference now to the drawings, and in particular to FIGS. 1 through 6 thereof, a new small animal litter material manufacturing method embodying the principles and concepts of the present invention and generally designated by the reference numeral 10 will be described.

The method of the present invention includes providing a plurality of sheets of full-size paper based newspaper 12. Next, a shredder 14 is provided which is adapted to shred the sheets of newspaper into strips 16. Each of such strips preferably has a length of about ¼ of an inch and a width of about 1 inch. During use, the sheets of newspaper are shredded within the shredder to generate the strips.

Figure 4:
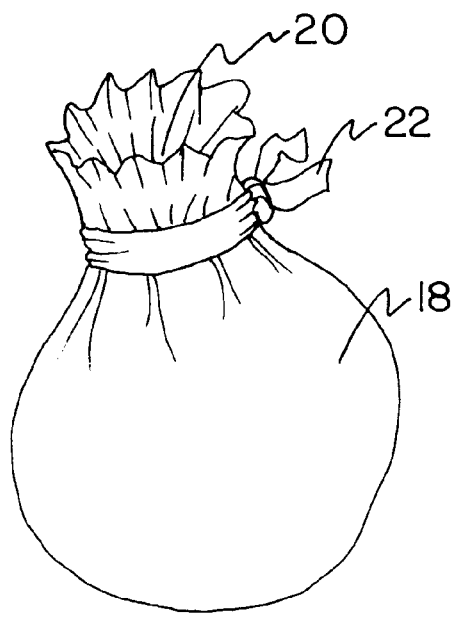
FIG. 4 is an illustration of the bag of the present invention.
Figure 5:
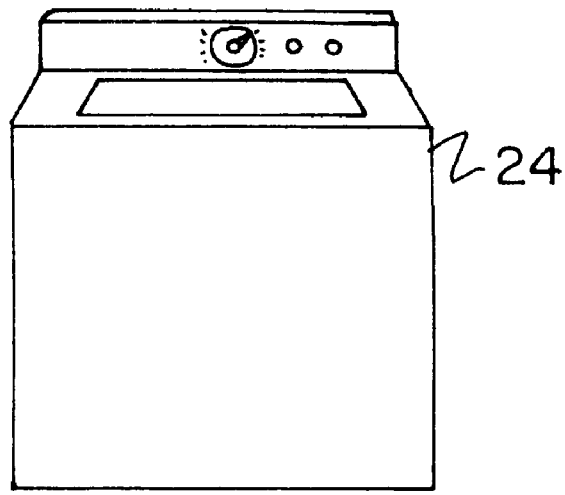
FIG. 5 is a perspective view of the washing machine of the present invention.
Figure 6:
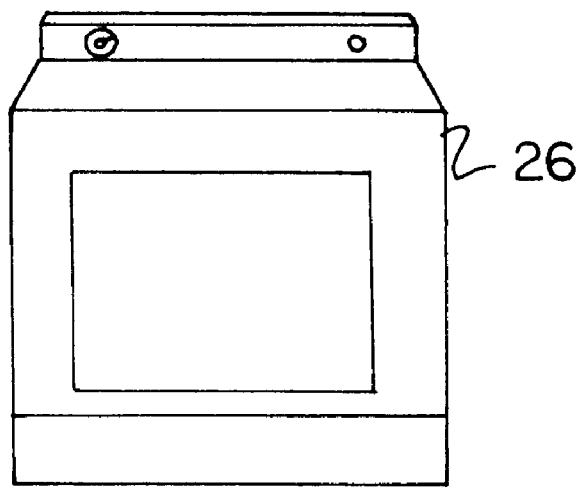
FIG. 6 is a perspective of the dryer of the present invention.

Next provided is a cloth bag 18 permeable to water. As shown in FIG. 4, the cloth bag has an opening 20 with a string 22 coupled adjacent thereto. By this structure, the cloth bag may be selectively tied shut to define a closed interior. While performing the method, the cloth bag is filled with the strips. Thereafter, the opening is closed by way of the string.

A washing machine 24 is provided which is adapted to fill with water and further agitate the water for a predetermined amount of time. The cloth bag, with the strips situated therein, is saturated with water within the washing machine. The agitation of the washing machine further effects the decomposition of the strips. It should be noted that the agitation is ideally accomplished using a reciprocating post mounted within the machine. To enhance the agitation of the strips afforded by the washing machine, at least three golf balls are situated within the bag with the strips.

Finally, a drier 26 is included having a tumbler mounted therein. The tumbler (not shown) is adapted to rotate and further generate heat therein. The cloth bag with the strips therein are situated within the dryer for a predetermined amount of time until the strips are dry. The contents of the bag are then emptied and are employed in a litter box of a small animal.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A method of producing cat litter comprising the steps of:

providing a plurality of sheets of paper based newspaper;

providing a shredder adapted to shred the sheets of newspaper into strips each having a length of about ¼ of an inch and a width of about 1 inch;

providing a cloth bag permeable to water, the cloth bag having an opening with a string coupled adjacent thereto, whereby the cloth bag may be selectively tied shut to define a closed interior;

providing a washing machine adapted to fill with water and further agitate the water for a predetermined amount of time;

providing a drier having a tumbler mounted therein which is adapted to rotate and further generate heat therein;

shredding the sheets of newspaper within the shredder to generate the strips;

filling the cloth bag with the strips and securing the opening in a closed condition with the string;

saturating the cloth bag and strips therein with water within the washing machine while simultaneously decomposing the strips by way of the agitation; and drying the cloth bag with the strips therein within the dryer for a predetermined amount of time until the strips are dry.

2. A method of producing litter comprising the steps of:

shredding sheets of paper to generate strips;

filling a water permeable bag with the strips;

saturating the bag and strips therein with water while simultaneously decomposing the strips by way of agitation; and drying the bag with the strips therein for a predetermined amount of time until the strips are dry.

3. A method of producing litter as set forth in claim 2 wherein the sheets of paper are newspaper.

4. A method of producing litter as set forth in claim 2 wherein the sheets of paper are shred into strips by way of a shredder.

5. A method of producing litter as set forth in claim 2 wherein each strip has a length of about ¼ of an inch and a width of about 1 inch.

6. A method of producing litter as set forth in claim 2 wherein the bag is made of cloth.

7. A method of producing litter as set forth in claim 2 wherein the bag has an opening that is closed by way of a string.

8. A method of producing litter as set forth in claim 2 wherein the strips are saturated with water in a washing machine adapted to fill with water and further agitate the water for a predetermined amount of time.

9. A method of producing litter as set forth in claim 2 wherein the strips are dried in a dryer with a tumbler mounted therein which is adapted to rotate and further generate heat therein.

\* \* \* \* \*